United States Patent Office 3,567,644
Patented Mar. 2, 1971

3,567,644
HYDRAULIC FLUID CONTAINING 1,4,5,6,7,7-HEXACHLOROBICYCLO - [2.2.1] - HEPT - 5-ENE-2-YL-METHYL ALKANOATE BASE
Bruce W. Hotten, Orinda, Calif., assignor to Chevron Research Company, San Francisco, Calif.
No Drawing. Filed May 21, 1968, Ser. No. 730,954
Int. Cl. C09k 3/00
U.S. Cl. 252—75       15 Claims

ABSTRACT OF THE DISCLOSURE

Flame-resistant hydraulic fluid and method of transmitting power employing fluid having as a base a chlorinated unsaturated ester which is a 1,4,5,6,7,7-hexachlorobicyclo-[2.2.1]-hept-5-ene-2-yl-methyl alkanoate.

BACKGROUND OF THE INVENTION

The growth of automated industrial equipment has greatly increased the need for nonflammable hydraulic oils. A number of materials have been employed in the past for this purpose. Included among these are the so-called phosphate fluids, or phosphate esters of various types. These materials, while extensively employed in aircraft because of their low densities, are not especially suitable for heavy industrial use precisely because of the low density; high density fluids act as much better power transfer agents. Also, the phosphate materials are low in flame resistance and have low viscosity indices, requiring the addition of substantial amounts of various viscosity index improvers in order to make them suitable for use over a variety of temperature ranges. This addition usually results in even lower flame resistance. Other materials that are often employed are chlorinated alkanes, such as chlorinated waxes. However, these materials require chlorination in the order of at least 40% to achieve substantial flame resistance, and at such a chlorine concentration, have viscosities so high that they are unsuitable for low temperature operation and also have low viscosity indices. Chlorinated arenes, also commonly used have extremely low viscosity indices.

The importance of high viscosity index in a hydraulic fluid results from the fact that systems are often required to be operated at considerable variations in temperature. Thus, if a fluid that is employed has a very low viscosity index, it will be suitable for operation over only a very limited temperature range. Thus, if it is desired to change the operating range of the equipment, it is necessary to drain the fluid from the system and replace it with one of suitable viscosity range for the desired temperature of operation. The viscosity index is especially important since hydraulic fluids usually serve a lubricating function as well as simply being a means of power transmission. Therefore, a fluid which becomes low in viscosity or extremely viscous at high temperature will fail to lubricate properly.

SUMMARY OF THE INVENTION

It has now been found that an improved method of transmitting hydraulic power comprises employing as a flame resistant power transmission media a fluid having as a base a chlorinated unsaturated ester which is a 1,4,5,6,7,7 - hexachlorobicyclo - [2.2.1]-hept-5-ene-2-yl-methyl alkanoate of the formula:

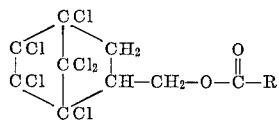

wherein R is an alkyl group of from 3 to 17 carbon atoms, preferably from 5 to 15 carbon atoms. R is also preferably a substantially straight chain alkyl group derived from a fatty acid.

DESCRIPTION OF THE PREFERRED EMBODIMENTS

The esters employed in the compositions and methods of this invention may be prepared by a Diels-Alder reaction of a dienophile with hexachlorocyclopentadiene. Thus, hexachlorocyclopentadiene may be reacted directly with an ester of allyl alcohol to form the desired product, or it may be reacted with allyl alcohol to form the tricyclic ring alcohol, followed by esterification with a fatty acid, etc. Alternatively, the materials may be prepared by transesterification of esters containing lower alcohols with esters containing alcohols of the desired chain lengths.

In the adduction of the dienophile to the diene, the materials are mixed together and stirred at a temperature of from 90° to 200° C. for a period of 4 to 8 hours. Reference to the general type of reaction involving hexachlorocyclopentadiene may be found in an article by C. W. Roberts, "Chemistry of Hexachlorocyclopentadiene," Chemistry and Industry, Feb. 1, 1958, pp. 110–115.

In order to employ the esters as bases for hydraulic fluids, it is usually necessary to combine them with conventional hydraulic fluid additives. For high temperature use it is especially desirable that a proton or acid acceptor and a rust inhibitor be included in the compositions.

The following examples illustrate the preparation of the fluids employed in this invention:

Example 1.—Preparation of 1,4,5,6,7,7-hexachlorobicyclo-[2.2.1]-hept-5-ene-2-yl-methyl laurate 109.2 g. (0.4 mole) of hexachlorocyclopentadiene were placed in a resin flask equipped with a stirrer, thermometer, condenser, and a dropping funnel. 96.2 g. (0.4 mole) of allyl laurate were added through the dropping funnel at 25° C. No temperature rise was observed. The mixture was heated with stirring and under reflux to 150° C. over a period of about 4 hours and held at about 150° C. for 2 hours. After cooling, I.R. analysis indicated that unreacted hexachlorocyclopentadiene remained. The mixture was reheated to 150° and held for an additional period of 3 hours. Analysis indicated a reduction in the diene present. The product, which was dark fluid, was topped under a pressure of 0.3 mm. Hg and at a flask temperature of 150° C. to a distillation temperature of 114° C. The residue gave the following analysis by nuclear activation: percent Cl, 41.5 (theoretical 41); percent O, 6.56 (theoretical 6.24).

Example 2.—Preparation of 1,2,3,4,7,7-hexachlorobicyclo-[2.2.1]-hept-2-ene-5-yl-butyrate In order to form the ring oxygen esters corresponding to the ester of the preceding example, 171.0 g. (1.5 moles) of vinyl butyrate was reacted with 409.5 g. of hexachlorocyclopentadiene. The chlorocyclodiene was placed in a resin flask equipped with stirrer, thermometer, condenser and dropping funnel. The ester was added dropwise at 25° C. from a dropping funnel. The mixture was heated at a temperature of 140 to 147° C. over a 1½ hour period. After cooling, infrared analysis indicated no reaction had taken place. The mixture was raised to 155° C. and after 1½ hours of heating, some reaction had taken place. Heating was continued for another 5 hours at a temperature of 130 to 150° C. Analysis indicated formation of the Diels-Alder adduct. The product was black, fluid and of net weight 574 g. The material was topped at 150° C. pot temperature (0.3 mm. Hg). A total of 42 ml. of yellow distillate was removed (I.R. indicating primarily hexachlorocyclopentadiene). The yield after topping was 496 g. Ninety g. of the product was distilled at 0.3 mm. Hg to a distillation temperature of 126° C. The distillate was a clear yellow liquid showing the following properties:

Percent Cl (neutron activation): 55.5 (theoretical 54.3)
Percent O (neutron activation): 8.03 (theoretical 8.26)
Density 20/4: 1.5023
Refractive index $n_D^{25}$: —1.5226
Pour point: —37° F.

Example 3.—Preparation of 1,4,5,6,7,7-hexachlorobicyclo-[2.2.1]-hept-5-ene-2-yl-hexanoate The procedure of Example 2 was followed, employing 47.0 g. of vinyl hexanoate and 90.4 g. of the hexachlorocyclopentadiene. The product was quite dark, indicating very poor thermal stability, and distillation under a vacuum of 0.2 to 0.3 mm. Hg produced only 10.5 ml. distillate.

A primary advantage in the use of the chlorinated bicycloheptene-substituted methyl ester base fluids as power transmission media lies in the high viscosity indices of the materials compared with previously used flame resistant fluids. Thus, this feature, combined with excellent flame resistance and thermal stability, makes them suitable for use in a wide variety of hydraulic power transmission applications. The following table shows the viscosity and pour point characteristics of the chlorinated bicycloheptene ester compared with representative commercially available flame-proof hydraulic fluids. The commercial materials include a chlorinated wax based material designated "A" and a chlorinated biphenyl based material designated "B."

TABLE I.—PHYSICAL PROPERTIES OF CHLORINATED BICYCLOHEPTENE-SUBSTITUTED METHYL ESTERS

| | Viscosity 100° F., SUS | Viscosity 210° F., SUS | Viscosity index | Pour point, ° F. |
|---|---|---|---|---|
| Fluid: | | | | |
| Example 1 | 60 | 7.4 | 92 | —13 |
| Example 2 | 4.1 | 4.7 | —30 | —35 |
| Example 3 | 36 | 4.7 | 2 | |
| A | 3,600 | 145 | 60 | |
| B | 40 | 3 | Negative | +20 |

From these data it may be seen that the chlorobicycloheptene-substituted methyl ester has a viscosity at 100° F. in a range making it suitable for use in relatively low temperature systems. Note that "A," a commercially available material, has a viscosity at 100° F. of 3600, making it entirely unsuitable for use at that temperature. The subject ester also has a positive and quite acceptable viscosity index (92), indicating that it may be used without additional viscosity additive over a wide temperature range. The pour points of the ester are also in a range that will allow their functioning at low temperatures (—13).

Upon prolonged heating at temperatures exceeding 300° F., the subject ester remains fluid, while the ring alcohol esters of Examples 2 and 3 become tarry, and are, therefore, unsuitable for high temperature use.

In order to demonstrate the flame resistance of the fluids, they were subjected to the following commonly employed flammability tests: Flash Point Test (ASTM D-92-57), Autogenous Ignition Test (ASTM D-286-58T) and a Pipe Wick Test in which passes through the flame before ignition are recorded. Reference to the latter test may be found in Aeronautical Material Specifications 3150-C (Society of Automotive Engineers). Data from these tests comparing the esters with commercial fluid "A" are included in Table II following.

TABLE II.—FLAME RESISTANCE OF CHLOROBICYCLOHEPTENE-SUBSTITUTED METHYL ESTERS

| | Flash point, ° F. | Autogenous ignition temperature ° F. | Pipe wick flammability, number of passes |
|---|---|---|---|
| Example 1 | 550 | 650 | 34 |
| B | 550 | | 24 |

It may be seen that the ester has a high flash point, is resistant to ignition in the Pipe Wick Test, and displays a high autogenous ignition temperature. The esters also are not harmful to enamel coatings. A commercial phosphate-base, high-temperature fluid completely stripped the paint in a paint compatibility test.

In using the fluids in hydraulic systems, it is necessary to employ, in addition to the ester bases, certain conventional hydraulic fluid additives.

Thus, for prolonged use, the fluids must contain a conventional acid acceptor, a conventional antioxidant, or a combination of both. For use in systems in which iron or steel will be contacted by the fluid, the use of a conventional rust inhibitor is necessary. Other conventional additives such as viscosity index improvers, dyes, oiliness agents, etc., may also be used.

The oxidation inhibitors which may be used in the fluids are, as noted, conventional materials for functional fluid use in general. The preferred materials are the arylamines and the hindered phenols. However, also suitable are a large variety of materials which have conventionally been used in functional fluids as antioxidants and anticorrodents.

Thus, in addition to the amines and phenols, materials may be employed such as phenothiazines, hydroxy anthracenes, metal dithiocarbamates and dithiocarbamate esters, metal dithiophosphates, dithiophosphate esters, dialkyl monosulfides, disulfides, alkyl sulfonamides, diaryl monosulfides, tetra-alkyl titanates, etc.

A general description of the antioxidants may be found in Scott, Atmospheric Oxidation and Antioxidants, Elsevier, Amsterdam, 1965. Particular reference to the most suitable antioxidants may be found on pp. 251 et seq. under "Lubricating Oil Antioxidants."

Examples of the diarylamine inhibitors which may be used include diphenylamine, phenyl-α-naphthylamine, and phenyl-β-naphthylamine, and the alkylated derivatives of these compounds containing alkyl groups of from 1 to 20 carbon atoms; and related compounds such as 4,4'-diaminodiphenyl methane, etc.

Suitable phenolic inhibitors include bis-phenol alkanes, bis-phenol sulfides, dihydroxy diphenyls, acylamino phenols, dihydroxybenzenes, and various p-tertiary alkyl bridged phenols, such as p-tert. butyl phenol, etc. A wide variety of these materials are disclosed in the Scott reference, previously mentioned, especially on pp. 283–290.

The acid acceptors which are employed in the fluids are materials which act as proton acceptors and prevent the buildup of corrosive acids in the fluids when they undergo decomposition under prolonged use at high temperatures. A preferred class of materials is the epoxy compounds, especially epoxidized naturally occurring material, such as epoxidized unsaturated glycerides, etc. Examples of suitable materials include epoxidized soybean oil, epoxidized castor oil, epoxidized linseed oil, epoxidized fats, etc. Other suitable materials include epoxy esters such as butyl epoxy acetoxy stearate, glyceryl triepoxy acetoxy stearate, isooctyl epoxy stearate, epoxidized isooctyl tallate, etc. In general, the acid portion of the simple esters and the glycerides will have from about 10 to 30 carbon atoms.

Also suitable are various alkyl and aralkyl epoxides such as epoxy decane, epoxy dodecane, epoxy hexadecane, epoxy octadecane, epoxy eicosane, etc. Cyclo-aliphatic epoxides, such as cyclododecane, pinene oxide, etc., are also suitable. 10–30 carbons are preferred with these materials.

Also suitable are glycidol and various glycidol ethers, such as glycidol phenyl ether, glycidol allyl ether, 2,2-bis (p-phenyl glycidoxy) propane, etc.

Other suitable acid acceptors are the metal alkyl phenates, and their sulfurized derivatives. Especially preferred are the overbased materials in which a base reserve is provided by the ratio of equivalents of alkaline earth to equivalents of phenol substantially greater than that in the normal salts. As noted, both the sulfonated and unsulfonated materials have been "overbased." Many method of overbasing have been disclosed; typical materials are set forth in U.S. Pats. Nos. 3,178,368, 3,194,761, and 3,336,224. A typical normal sulfurized alkaline earth phenate may be represented by the formula:

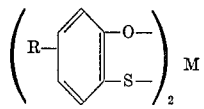

in which R represents the alkyl radicals on the benzene ring, and M is an alkaline earth metal. The sulfur is attached to both rings. Other configurations are possible, i.e., rather than two like rings being connected in the above example, attachment may be made to an alkaryl, aryl, alkyl, or alkyl-aryl group.

The metals may be aluminum, cobalt, chromium, sodium, lead, etc., or an alkaline earth metal such as calcium, barium, strontium, or magnesium. The preferred metal is calcium.

Another important class of acid acceptors which may be used are the oil-soluble salts of high molecular weight sulfonic acid usually produced by the treatment of petroleum oils with fuming sulfuric acid.

The overbased materials which are equivalent to the overbased phenates are preferred.

The sulfonic acids generally have molecular weights from about 350 to 650. Many patents have described the material; typical are U.S. 2,454,736 and U.S. 2,467,176. Overbased materials are described in U.S. 2,833,716 and many other patents.

The acid acceptors and oxidation inhibitors are employed in minor amounts, sufficient to prevent decomposition of the fluid and attacks upon the hydraulic systems. Amounts of from 0.1 to 10% by weight are usually sufficient; 0.1 to 5% is preferred.

The rust inhibitors which may be used include a wide variety of materials commonly employed in functional fluids. Thus, the rust inhibitors may include high molecular weight amines, alkyl maleamides, other amides, alkyl and alkenyl succinic acids, pyromellitic acid amide, trimellitic acid amides, etc. Specific examples of useful inhibitors include acyl sarcosines, such as oleyl, sarcosine, ethoxylated soybean amine, the maleamide produced from reaction of maleic anhydride and soybean amine, amide from the reaction of alkenyl succinic anhydride ($C_{10}$–$C_{20}$ alkenyl) with dibutylamine, and an amide produced by reaction of alkenyl succinic anhydride with diethylamine. The amide type of rust inhibitor is preferred.

The rusting inhibitors are generally present in amounts of from 0.1 to 5% by weight, a preferred range being from about 0.5 to 2%.

In addition to the additives previously mentioned, other conventional additives may be employed in the compositions. For example, supplementary oxidation inhibitors such as the various phenolic inhibitors and diarylamine inhibitors may be used. While the fluid bases themselves have outstanding viscosity indices, it may be desirable in many applications to include commonly used viscosity index improvers in order to achieve even higher viscosity indices. Examples of these inhibitors are the acryloids, etc. Dyes, sludge inhibitors, antifoaming agents, etc. may also be included.

The hydraulic systems in which the methods and compositions of this invention are very useful are, as previously noted, industrial systems used to transmit power to various items of machinery. These systems are becoming increasingly important in industry because of the ease with which they may be adapted to automatic and computerized control. In general, two major components characterize the systems. These components are a means to impart pressure to the fluid and a second means for converting the pressure to useful mechanical motion. These components usually are piston or vane-type pumps; however, other high pressure pumps are suitable. Secondary components of the systems usually include a reservoir for storage of fluid, means to control the flow, such as valves, and means, such as pipes, to conduct the fluid from the reservoir to the pump and to the motor.

The pumps which are used to impart pressure to the fluid, and the hydraulic motors which receive energy from the fluid, are constructed to minimize leakage at high pressures. Thus, close tolerances must be maintained in equipment, and the hydraulic fluids must lubricate the parts as well as transmit power. Thus, the fluids of this invention are especially advantageous for use in these systems because of their high indices and pour points which allow lubrication of the parts subject to wear over quite wide temperature ranges, from about −40° F. to over 300° F.

I claim:

1. A method of transmitting power which comprises applying force to a hydraulic power transmission fluid which consists essentially of an alkyl 1,4,5,6,7,7-hexachlorobicyclo[2.2.1]-hept - 5 - ene - 2 - carboxylate of the formula:

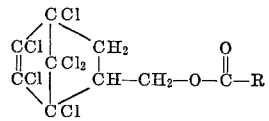

in which R is an alkyl group of from 3 to 17 carbon atoms.

2. The method of claim 1 in which R contains from 5 to 15 carbon atoms.

3. The method of claim 2 in which R is substantially straight chain.

4. The method of claim 1 wherein the power transmission fluid contains from 0.1 to 10% by weight of an arylamine or hindered phenol antioxidant.

5. The method of claim 1 wherein the power transmission fluid contains from 0.1 to 10% by weight of an acid acceptor selected from the group consisting of epoxy compounds, overbased metal alkylphenates, overbased sulfurized metal alkylphenates, and oil-soluble salts of high molecular weight sulfonic acids.

6. The method of claim 4 wherein the power transmission fluid contains, in addition, from about 0.1 to about 5% by weight of an amine or amide rust inhibitor.

7. A power transmission fluid consisting essentially of a major portion of an alkyl 1,2,3,4,7,7-hexachlorobicyclo-[2.2.1]-hept-2-ene-5-carboxylate of the formula:

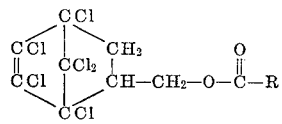

in which R is an alkyl group of from 3 to 17 carbon atoms, and a minor portion of an acid acceptor selected from the group consisting of epoxy compounds, overbased metal alkylphenates, overbased sulfurized metal alkyl phenates, and oil-soluble salts of high molecular weight sulfonic acids.

8. The fluid of claim 7 in which the acid acceptor is an overbased metal alkyl phenate or an oil-soluble salt of a high molecular weight sulfonic acid.

9. The fluid of claim 7 also containing an additional minor portion of an arylamine or hindered phenol antioxidant.

10. The fluid of claim 7 in which the antioxidant is a diaryl amine.

11. The fluid of claim 10 in which the diaryl amine is phenyl-α-naphthyl amine.

12. The fluid of claim 7 in which R contains from 6 to 16 carbon atoms.

13. The fluid of claim 8 in which R is substantially straight chain.

14. The fluid of claim 8 wherein the fluid contains an additional minor portion of an amine or amide rust inhibitor.

15. The fluid of claim 14 in which the rust inhibitor is an alkyl maleamide.

References Cited

UNITED STATES PATENTS

| | | | |
|---|---|---|---|
| 3,371,108 | 2/1968 | Dissen | 252—54.6X |
| 3,489,792 | 1/1970 | Greenbaum et al. | 260—410X |
| 3,494,867 | 2/1970 | Hotten | 252—75 |

LEON D. ROSDOL, Primary Examiner

D. SILVERSTEIN, Assistant Examiner

U.S. Cl. X.R.

252—76, 77, 78